No. 867,384. PATENTED OCT. 1, 1907.
E. M. LANG, Jr.
MANUFACTURED SOLDER.
APPLICATION FILED DEC. 10, 1906.

Witnesses:
A. G. McPherson.
A. C. Perry.

Inventor.
Edward M. Lang, Jr.
by Geo. E. Bird
Atty.

UNITED STATES PATENT OFFICE.

EDWARD M. LANG, JR., OF PORTLAND, MAINE.

MANUFACTURED SOLDER.

No. 867,384.

Specification of Letters Patent.

Patented Oct. 1, 1907.

Application filed December 10, 1906. Serial No. 347,172.

*To all whom it may concern:*

Be it known that I, EDWARD M. LANG, Jr., a citizen of the United States, residing at Portland, in the county of Cumberland and State of Maine, have invented an Improvement in Manufactured Solder; and I do hereby declare that the following is a full, clear, and exact description of the invention, which will enable others skilled in the art to which it appertains to make and use the same.

My invention relates to the manufacture of solder particularly for the purpose of soldering can caps, as well as the tops and bottoms of cans.

It consists in a ring or washer of solder between the upper and lower surfaces of which ring or washer is inclosed a flux which is distributed with substantial uniformity throughout the ring. Where, however, it is to be made use of in soldering a cap or top of other than circular form, the ring or washer is made of a shape to conform thereto. The ring or washer is curved to enable it better to be received into and fit the groove around the stud in the top of the can. Such ring or washer containing as it does the necessary amount of flux to enable the soldering of each cap to be accomplished, the process of soldering is performed with greater thoroughness by reason of the substantial uniformity of the distribution of the flux while the manner in which it is inclosed between the surfaces of the ring is such as to enable it to be transported for long distances or kept for any length of time without loss of flux either by evaporation or by handling.

Figure 1:
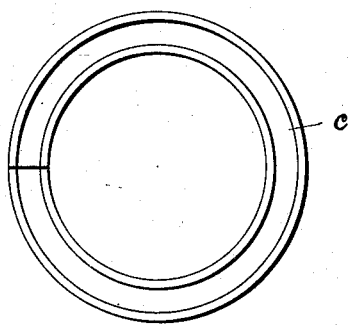
Figure 2:
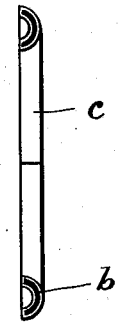

I prefer that the ring should be split, as shown in Figures 1 and 2 whereby the ring or washer can be adjusted to the grooves and caps in spite of the variations which are found in them caused either by the wearing away of the dies or from other causes.

Figure 3:
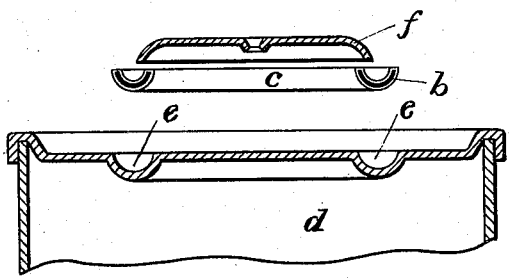

In the drawing: Fig. 1 is a top plan of the washer; Fig. 2 is a vertical section of the same; Fig. 3 is a vertical section of the end of the can with curved solder ring and cap ready to be assembled.

Referring to the drawing, the ring or washer *c* is shown in Figs. 1—2, the flux *b* being completely inclosed between the upper and lower surfaces of the ring *c*. In Fig. 5, the method of using the ring in soldering can caps is shown. The ring *c* is placed in the groove or seat *e* around the stud of the can *d* and the cap *f* placed in the groove of the ring or washer *c* when the soldering process is completed in the usual manner.

What I claim is:

As a new article of manufacture, a split solder ring, curved uniformly in cross section to fit around the edge of a can cap, and having a layer of flux therein, entirely inclosed by the solder, substantially as described.

In testimony whereof, that I claim the foregoing as my invention I have hereunto set my hand this seventh day of December, A. D. 1906.

EDWARD M. LANG, JR.

Signed in presence of—
GEO. E. BIRD,
A. C. BERRY.